United States Patent
Nagatake et al.

(10) Patent No.: US 8,488,555 B2
(45) Date of Patent: Jul. 16, 2013

(54) PACKET PRIORITY CONTROL METHOD AND BASE STATION

(75) Inventors: Eiji Nagatake, Tokyo (JP); Akihito Morimoto, Tokyo (JP)

(73) Assignees: Mitsubishi Electric Corporation, Tokyo (JP); NTT DoCoMo, Inc., Tokyo (JP)

( * ) Notice: Subject to any disclaimer, the term of this patent is extended or adjusted under 35 U.S.C. 154(b) by 980 days.

(21) Appl. No.: 12/526,117

(22) PCT Filed: Nov. 15, 2007

(86) PCT No.: PCT/JP2007/072210
§ 371 (c)(1),
(2), (4) Date: Sep. 9, 2009

(87) PCT Pub. No.: WO2008/096490
PCT Pub. Date: Aug. 14, 2008

(65) Prior Publication Data
US 2010/0322188 A1    Dec. 23, 2010

(30) Foreign Application Priority Data
Feb. 6, 2007    (JP) .................................. 2007-027160

(51) Int. Cl.
*H04W 4/00*    (2009.01)
(52) U.S. Cl.
USPC .............................. 370/331; 370/329; 370/330
(58) Field of Classification Search
USPC ......................................................... 370/331
See application file for complete search history.

(56) References Cited

U.S. PATENT DOCUMENTS

| 7,103,364 | B2 |   | 9/2006 | Ishikawa et al. |
|---|---|---|---|---|
| 2003/0076791 | A1 |   | 4/2003 | Sawabe et al. |
| 2005/0141477 | A1 | * | 6/2005 | Tomita et al. ................. 370/349 |
| 2006/0209686 | A1 |   | 9/2006 | Wigard et al. |
| 2007/0253358 | A1 | * | 11/2007 | Das et al. ...................... 370/328 |
| 2008/0165727 | A1 | * | 7/2008 | Xiaoben et al. ............... 370/329 |

FOREIGN PATENT DOCUMENTS

| JP | 2003 110574 | 4/2003 |
|---|---|---|
| JP | 2004 40536 | 2/2004 |
| JP | 2004 304325 | 10/2004 |
| JP | 2005 323034 | 11/2005 |
| WO | 2004 030396 | 4/2004 |

OTHER PUBLICATIONS

Office Action issued Mar. 21, 2012 in Taiwan Application No. 097102793.

* cited by examiner

*Primary Examiner* — Shripal Khajuria
(74) *Attorney, Agent, or Firm* — Oblon, Spivak, McClelland, Maier & Neustadt, L.L.P.

(57) ABSTRACT

A handover-source base station transfers a data packet destined to a mobile device received from a base station control device to a handover-destination base station as an inter-base-station transfer packet during a stopping period for which the handover-source base station stops a wireless transmission of a data packet to the mobile device. The handover-destination base station calculates a wireless transmission priority for the inter-base-station transfer packet based on a station retention time in the handover-destination base station and an estimated value of a retention time in the handover-source base station.

10 Claims, 11 Drawing Sheets

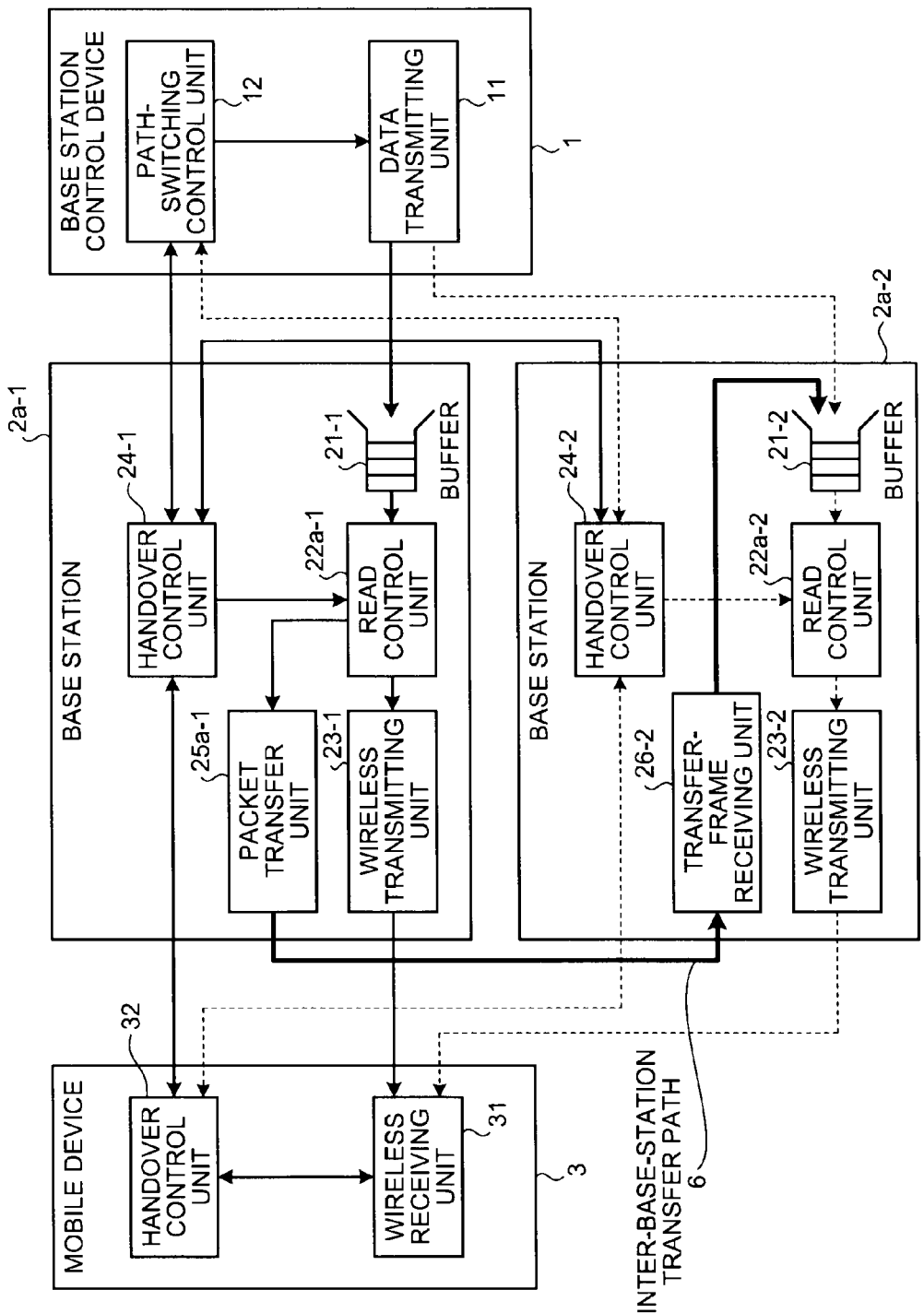

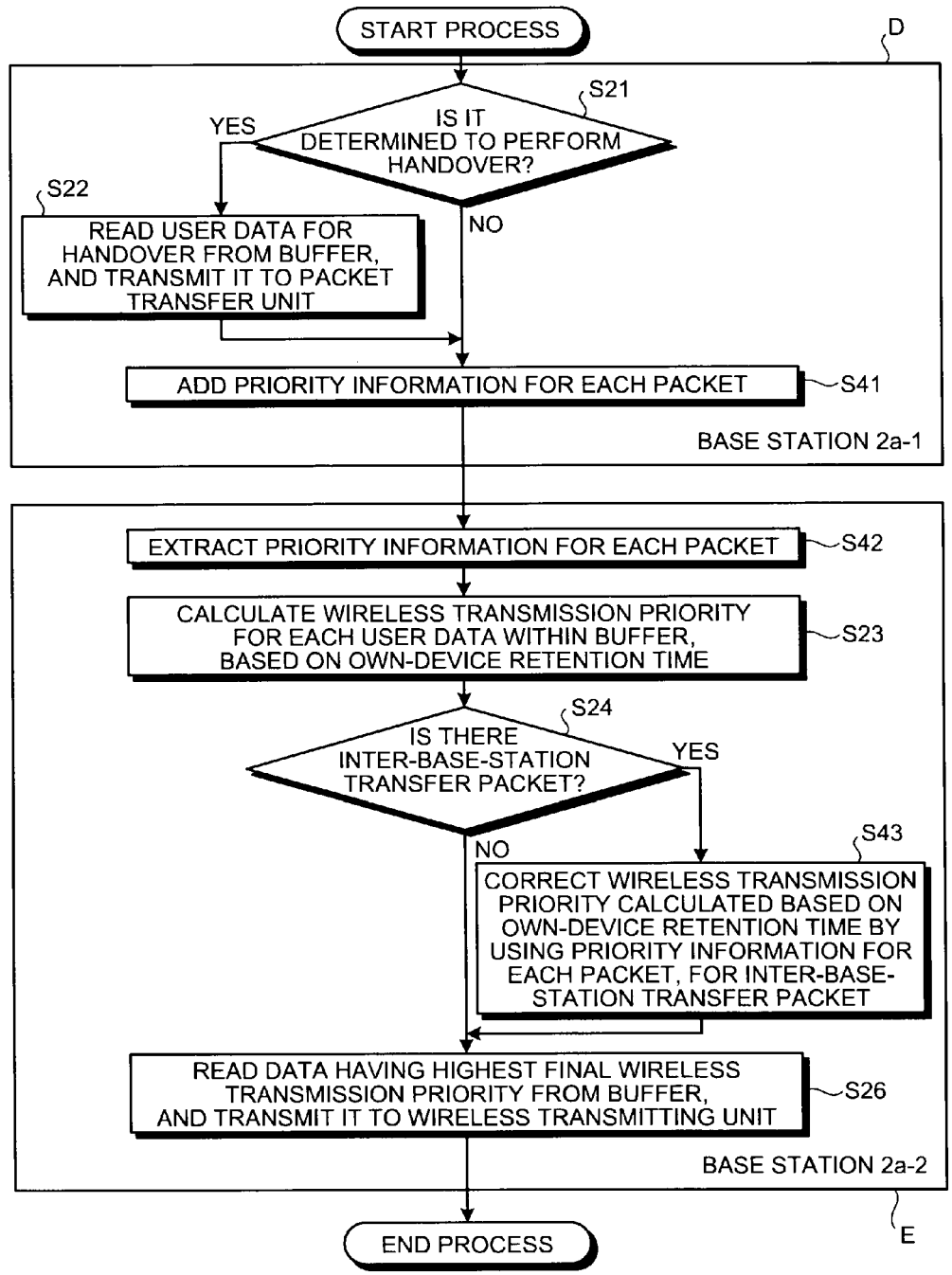

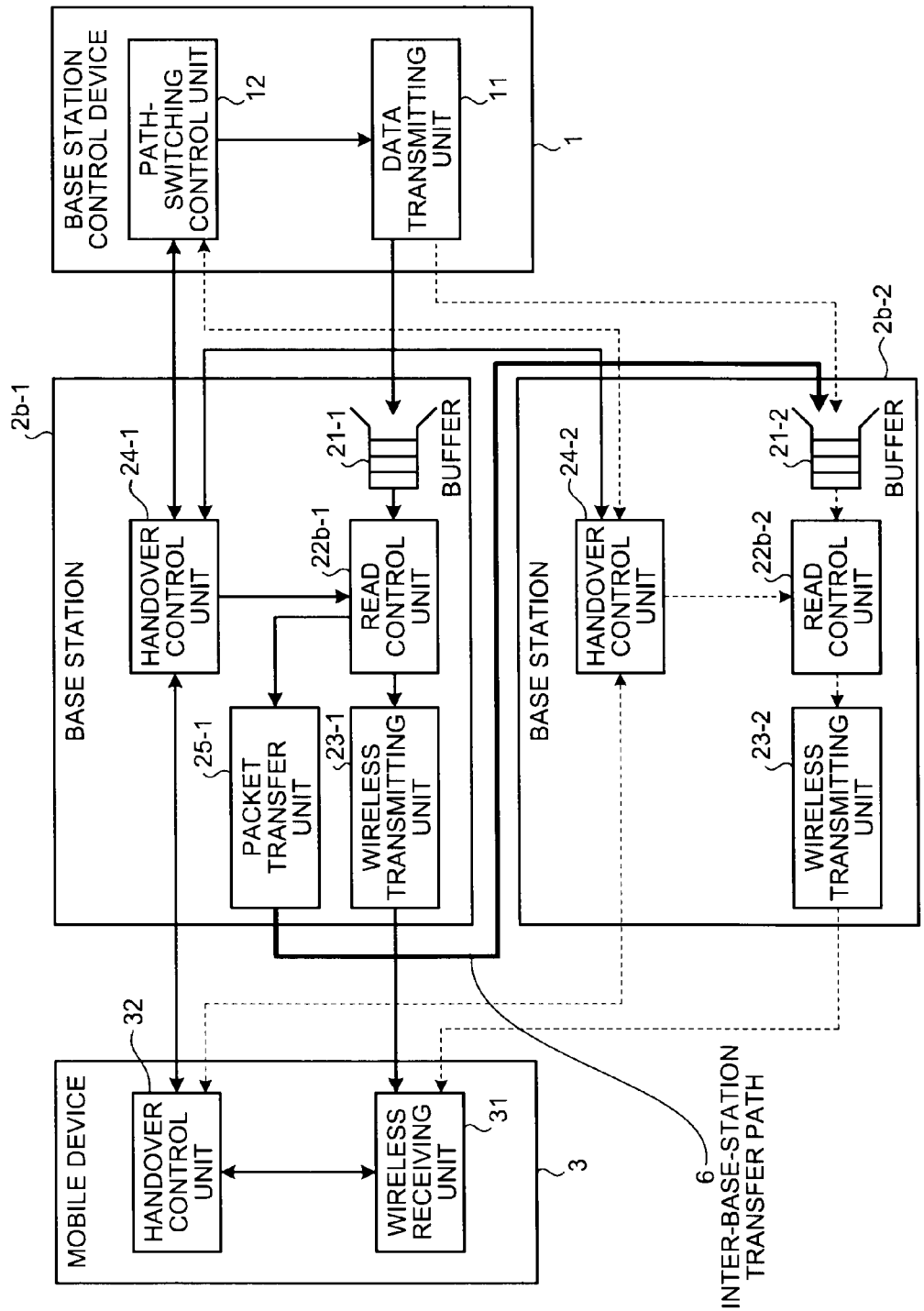

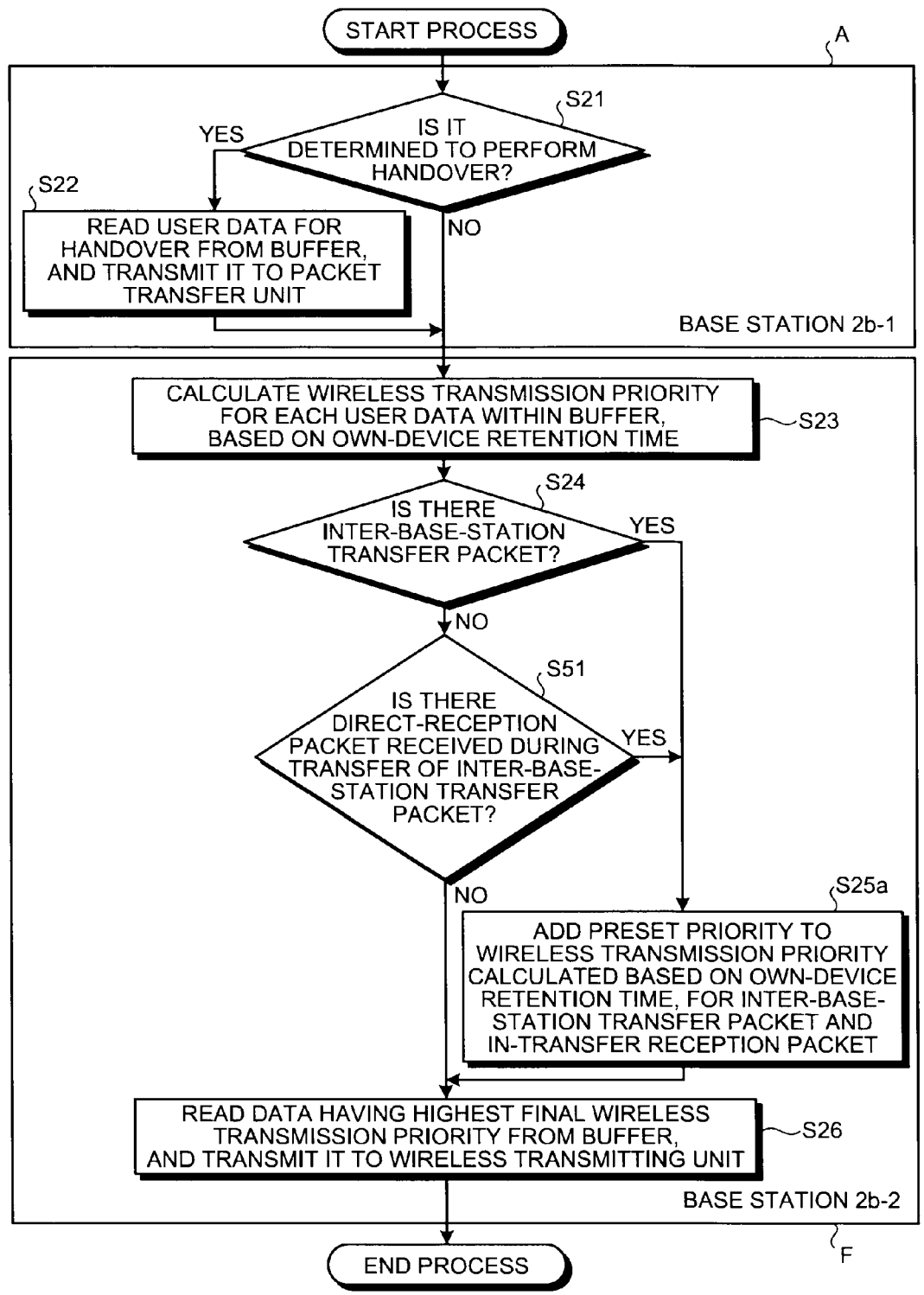

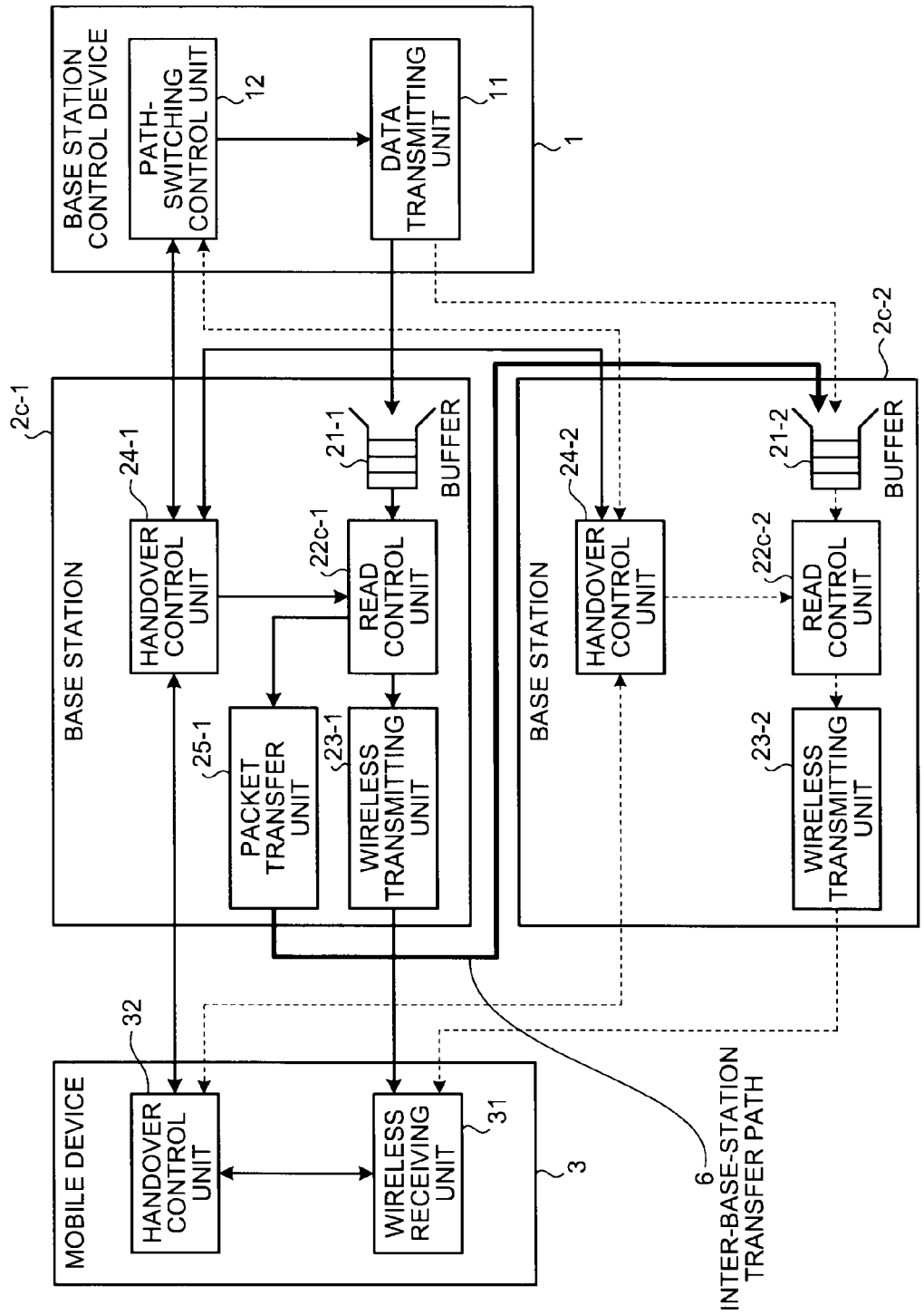

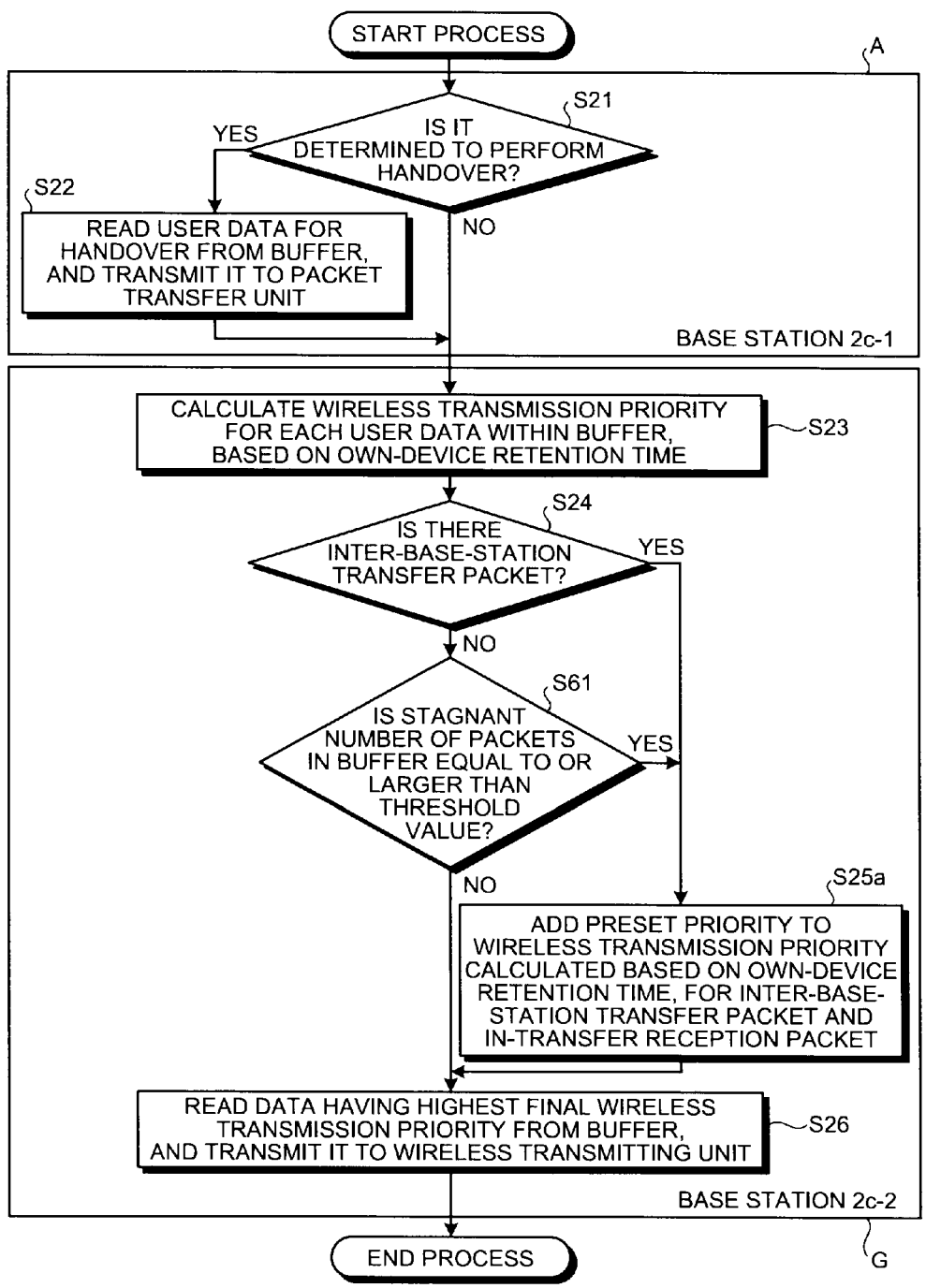

PACKET PRIORITY CONTROL METHOD AND BASE STATION

TECHNICAL FIELD

The present invention relates to a packet priority control method during a handover a base station in a wireless communication system that includes a mobile device.

BACKGROUND ART

Conventionally, in a wireless communication system, to prevent the occurrence of data packet loss during handover of a mobile device, a system that performs a packet transfer between base stations (hereinafter, "packet-transfer handover system") has been proposed. The packet-transfer handover system is explained below.

In a wireless access network of a wireless communication system such as the IMT (International Mobile Telecommunication) 2000 and the CDMA (Code Division Multiple Access) 2000, a mobile device performs communications with a base station while moving between communication areas called "cell" generated by plural base stations. When the mobile device reaches near a cell boundary and when the mobile device becomes difficult to continue communication with a base station because of a degraded quality of wireless communication, the mobile device is handed over to another base station having a better quality of wireless communication.

In the packet-transfer handover system, a handover-source base station to which a mobile device is connected before performing handover transfers an untransmitted data packet destined to the mobile device and remaining in own base station, to a handover-destination base station before performing the handover of the mobile device. The handover-destination base station transmits the transferred data packet. By transferring the data packet destined to the mobile device between the base stations in this way, the occurrence of a loss of the data packet destined to the mobile device during handover is prevented.

However, according to the packet-transfer handover system, a transfer delay corresponding to a time required for a handover control process and a transfer between base stations occurs in an inter-base-station transfer packet. Therefore, at the time of handling real-time data such as streaming, there is a risk of losing a real-time characteristic of communications. As a method of maintaining a real-time characteristic of communications during handover, Patent Document 1 mentioned below discloses a method of controlling a transmission timing of a packet from a handover-source base station, by adjusting a process delay due to handover to an inter-base-station transfer packet at the handover. Further, Patent Document 2 mentioned below discloses a method of preventing an increased delay of an inter-base-station transfer packet, by transmitting a packet to be transferred between base stations with priority over a non-transferred packet.

Meanwhile, in a base station of such a wireless communication system, priority control is performed between multiple users corresponding to quality of service (QoS) at the time of transmitting data to a wireless transmission path. As one of priority control methods, there is a priority control of determining a priority of wireless transmission (hereinafter, "delay priority control") based on an upper limit (a delay tolerance) to a device retention time of a data packet. The device retention time is a time during which a data packet remains in a buffer within the device. It is assumed that the device retention time indicates a time from a time (a receiving time) when the device receives a data packet until a time when the device calculates a wireless transmission priority. In the delay priority control, when the device retention time is nearer the permissible delay, a data packet is transferred with priority by increasing a value of the wireless transmission priority, and the device retention time is controlled not to exceed the permissible delay.

Patent Document 1: Japanese Patent Application Laid-open No. 2004-304325

Patent Document 2: International Publication No. WO04/030396 Pamphlet

DISCLOSURE OF INVENTION

Problem to be Solved by the Invention

However, Patent Document 1 and Patent Document 2 mentioned above disclose only priority control to a single user, and do not have any definition regarding priority control to the inter-base-station transfer packet between users. Therefore, when an inter-base-station transfer packet is transmitted unconditionally with a highest priority, there is a problem that a delay occurs in a data packet that a handover-destination base station transmits to mobile devices of other users.

Further, there is no definition regarding the inter-base-station transfer packet, in a wireless transmission priority using the conventional device retention time described above. To perform a fair calculation of a wireless transmission priority (that is, to perform fair priority control) to reorder a wireless transmission to data of multiple users, a value calculated in the same condition needs to be used in calculating a wireless transmission priority of each user data. For example, a packet directly received from a host node is compared with a packet received via a transfer between base stations. From the viewpoint of a data packet delay to a mobile device, it is preferable to use as a reference a time when a data packet is transmitted from the host node, and when a wireless transmission priority is simply calculated based only on the device retention time within the own device, conditions become different in calculating a wireless transmission priority, between a data packet directly received from the host node and a data packet received via a transfer between stations. Therefore, to perform fair priority control, the device retention time in a handover-source base station also needs to be taken into account, to use the time when a data packet is transmitted from the host node as the reference.

However, when a certain base station calculates the device retention time by simply using a reception time in the base station as a calculation starting time as is done conventionally, the device retention time in a handover-source base station is not taken into account for the inter-base-station transfer packet received via a transfer between base stations. Therefore, the wireless transmission priority attached to the inter-base-station transfer packet becomes lower than a value that is originally supposed to be attached, and a delay occurs in the inter-base-station transfer packet.

The present invention has been achieved in view of the above problems, and an object of the invention is to obtain a packet priority control method that prevents the occurrence of data packet loss during handover of a mobile device and that prevents the occurrence of a transfer delay of an inter-base-station transfer packet while maintaining the fairness between users.

Means for Solving Problem

To solve the above problems and to achieve the object, the present invention relates to a packet priority control method for a specific mobile device to perform handover in a wireless communication system in which a base station calculates a wireless transmission priority for each predetermined data packet received from a base station control device, based on own-station retention time from the reception until a current time. The packet priority control method includes an inter-base-station packet transfer step for a handover-source base station to stop a wireless transmission of a data packet to the mobile device, and transfer a data packet destined to the mobile device received from the base station control device during a stopping period to a handover-destination base station as an inter-base-station transfer packet; and a transmission control step for the handover-destination base station to calculate a wireless transmission priority for the inter-base-station transfer packet, based on the own-station retention time and a retention time in the handover-source base station.

Effect of the Invention

According to the present invention, during handover of a mobile device, a handover-destination base station calculates a wireless transmission priority of a packet other than an inter-base-station transfer packet, based on own-device retention time, and the handover-destination base station calculates a wireless transmission priority of an inter-base-station transfer packet, based on a priority corresponding to the own-device retention time and the device retention time of a handover-source base station. Therefore, the occurrence of a transfer delay of an inter-base-station transfer packet can be prevented while maintaining the fairness between users.

BRIEF DESCRIPTION OF DRAWINGS

FIG. 6 is a functional configuration example of a base station control device, base stations, and a mobile device according to a third embodiment.

FIG. 7 is a flowchart of a wireless-transmission priority process of the third embodiment.

FIG. 8 is a functional configuration example of a base station control device, base stations, and a mobile device according to a fourth embodiment.

FIG. 9 is a flowchart of a wireless-transmission priority process of the fourth embodiment.

FIG. 10 is a functional configuration example of a base station control device, base stations, and a mobile device according to a fifth embodiment.

FIG. 11 is a flowchart of a wireless-transmission priority process of the fifth embodiment.

Figure 1:
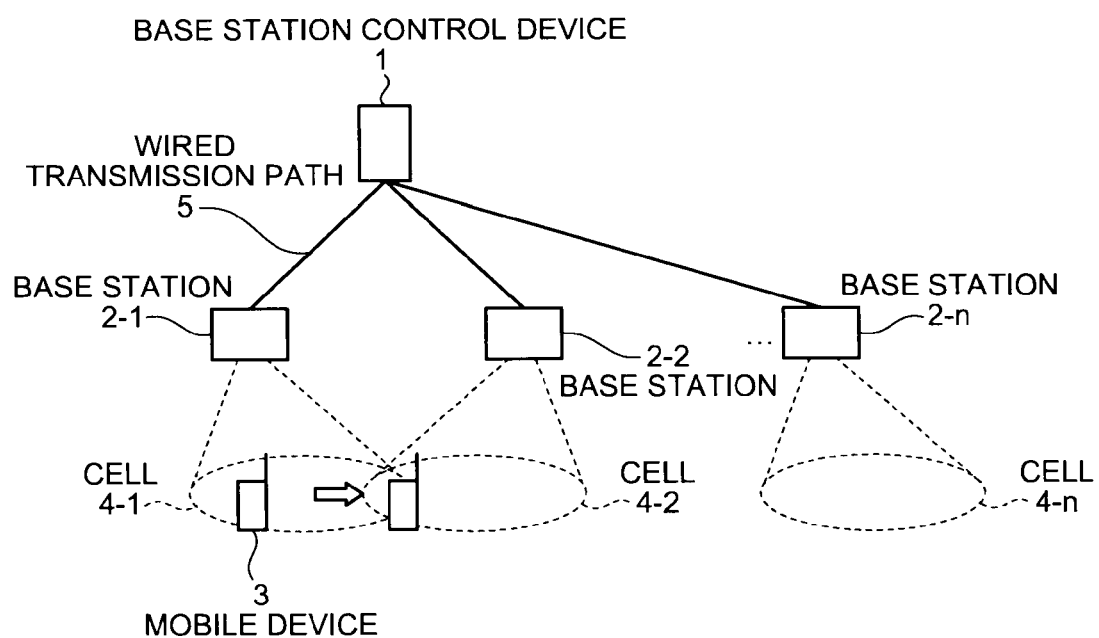
FIG. 1 is a configuration example of a wireless access network according to a first embodiment of the present invention.

EXPLANATIONS OF LETTERS OR NUMERALS 1 base station control device
2-1 to 2-*n*, 2*a*-1 to 2*a*-*n*, 2*b*-1 to 2*b*-*n*, 2*c*-1 to 2*c*-*n* base station
3 mobile device
4-1 to 4-*n* cell
5 wired transmission path
6 inter-base-station transfer path
11 data transmitting unit
12 path-switching control unit
21-1, 21-2 buffer
22-1, 22-2, 22*a*-1, 22*a*-2, 22*b*-1, 22*b*-2, 22*c*-1, 22*c*-2 read control unit
23-1, 23-2 wireless transmitting unit
24-1, 24-2 handover control unit
25-1, 25*a*-1 packet transfer unit
26-2 transfer-frame receiving unit

BEST MODE(S) FOR CARRYING OUT THE INVENTION

Exemplary embodiments of a packet priority control method according to the present invention will be explained below in detail with reference to the accompanying drawings. The present invention is not limited thereto.

First Embodiment

FIG. 1 is a configuration example of a wireless access network that realizes a packet priority control method according to a first embodiment of the present invention. As shown in FIG. 1, the wireless access network of the present embodiment includes a base station control device 1 that distributes data to base stations 2-1 to 2-*n* within a wireless access network, the base stations 2-1 to 2-*n* (n represents the number of base stations) that transmit data received from the base station control device 1 via a wired transmission path 5 to a wireless transmission path and that determine whether it is necessary to perform handover based on wireless quality information received from a mobile device 3, cells 4-1 to 4-*n* formed as communication areas for each of the base stations 2-1 to 2-*n* to communicate with the mobile device 3 via the wireless transmission path, and the wired transmission path 5 that connects between the base station control device 1 and each of the base stations 2-1 to 2-*n*. The base stations 2-1 to 2-*n* are also connected to a wireless terminal (not shown) other than the mobile device 3.

Figure 2:
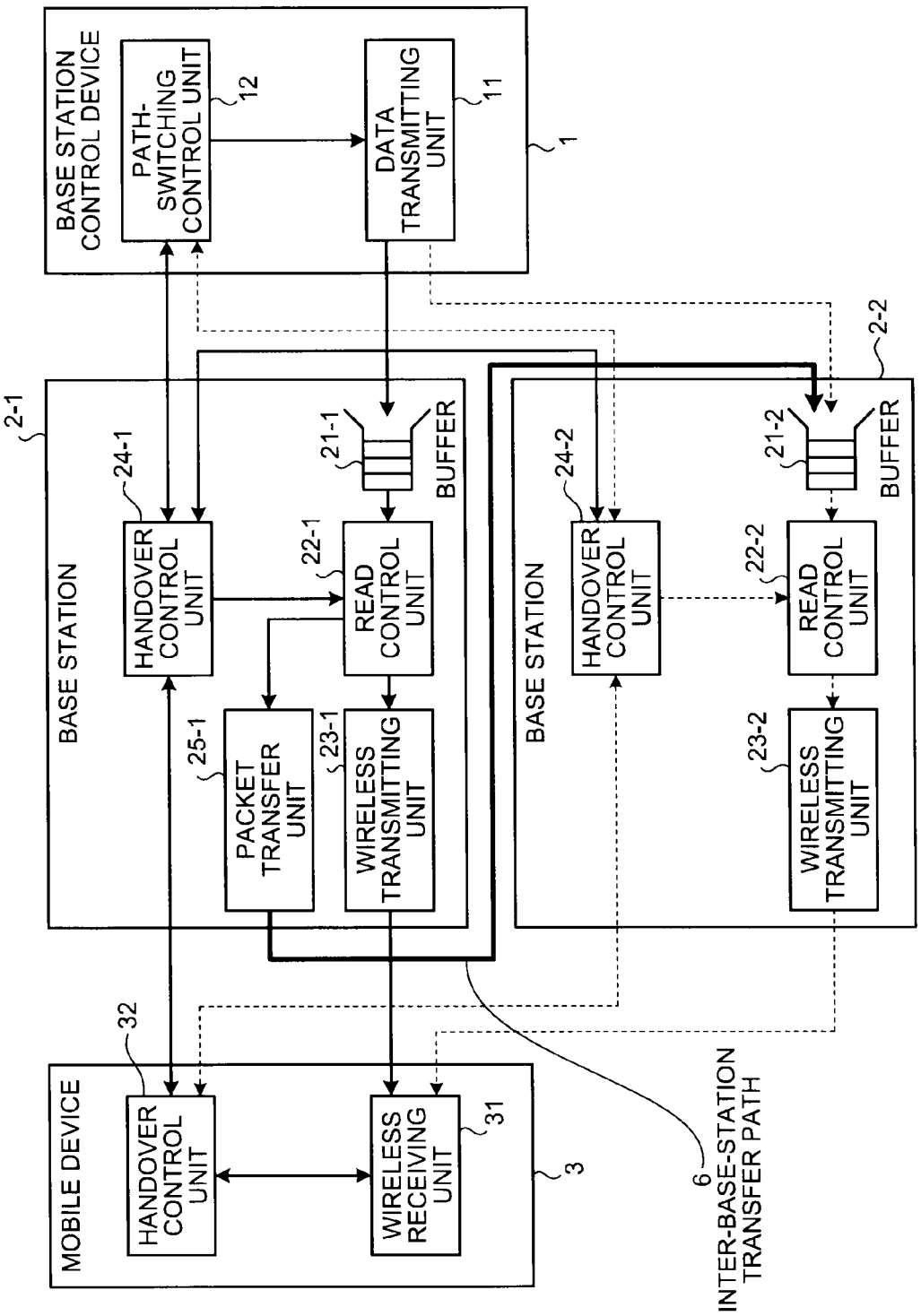
FIG. 2 is a functional configuration example of a base station control device, base stations, and a mobile device according to the first embodiment.

FIG. 2 is a functional configuration example of the base station control device 1, the base stations 2-1 to 2-*n*, and the mobile device 3. In FIG. 2, the mobile device 3 moves from the cell 4-1 as a communication area of the base station 2-1 to the cell 4-2 as a communication area of the base station 2-2. An inter-base-station transfer path 6 is a path through which an inter-base-station transfer packet is transferred. Dotted lines in FIG. 2 denote data transfer paths of a data packet related to the mobile device 3 after handover. In general, because the base stations 2-1 and 2-2 can be both a handover source and a handover destination, the base stations 2-1 and 2-2 have the same configurations. For the sake of explanation, constituent elements necessary for a handover-source base station are shown for the base station 2-1, and constituent elements necessary for a handover-destination base station are shown for the base station 2-2.

The mobile device 3 includes a wireless receiving unit 31 that receives wireless transmission data from the base stations 2-1 and 2-2 and extracts data (such as reception power) necessary to calculate wireless quality information of the received data, and a handover control unit 32 that calculates quality information necessary to determine whether it is necessary to perform handover by using data necessary to calculate the wireless quality information extracted by the wireless receiving unit 31 and that stores a result of the calculation into a control message as wireless quality information and notifies this wireless quality information to the base station 2-1.

The base station 2-1 includes a buffer 21-1 that temporarily stores data received from the base station control device 1, a read control unit 22-1 that calculates a wireless transmission priority of each of data packets destined to multiple users stored in the buffer 21-1 and reads data packets stored in the buffer 21-1 based on wireless transmission priorities, a wireless transmitting unit 23-1 that converts read data into a wireless transmission signal and transmits this signal to the mobile device 3 within the cell 4-1 via the wireless transmission path, a handover control unit 24-1 that determines whether to hand over the mobile device 3 based on the wireless quality information stored in a control message transmitted from the mobile device 3, and a packet transfer unit 25-1 that transmits data read by the read control unit 22-1 to the base station 2-2 as a handover-destination base station as an inter-base-station transfer packet via the inter-base-station transfer path 6.

A buffer 21-2, a read control unit 22-2, a wireless transmitting unit 23-2, and a handover control unit 24-2 in the base station 2-2 respectively have functions identical to functions of the buffer 21-1, the read control unit 22-1, the wireless transmitting unit 23-1, and the handover control unit 24-1 in the base station 2-1 respectively, except that branch numbers of the constituent elements related to operations are changed from 1 to 2. Because the base station 2-1 and the base station 2-2 can generally become a handover source and a handover destination, these base stations have the same configurations. For the sake of explanation, functional configurations necessary for a handover source are shown for the base station 2-1, and functional configurations necessary for a handover destination are shown for the base station 2-2. Because a packet transfer unit 25-2 is a constituent element necessary only when the base station 2-2 becomes a handover source, the packet transfer unit 25-2 is omitted from FIG. 2.

The base station control device 1 includes a data transmitting unit 11 that transmits data packets destined to mobile devices connected to the base stations 2-1 and 2-2 to the base station 2-1 and the base station 2-2, respectively, and a path-switching control unit 12 that receives a path-switching request message from the base station 2-2 and transmits a switching instruction of a data transmission path to the data transmitting unit 11.

Figure 3:
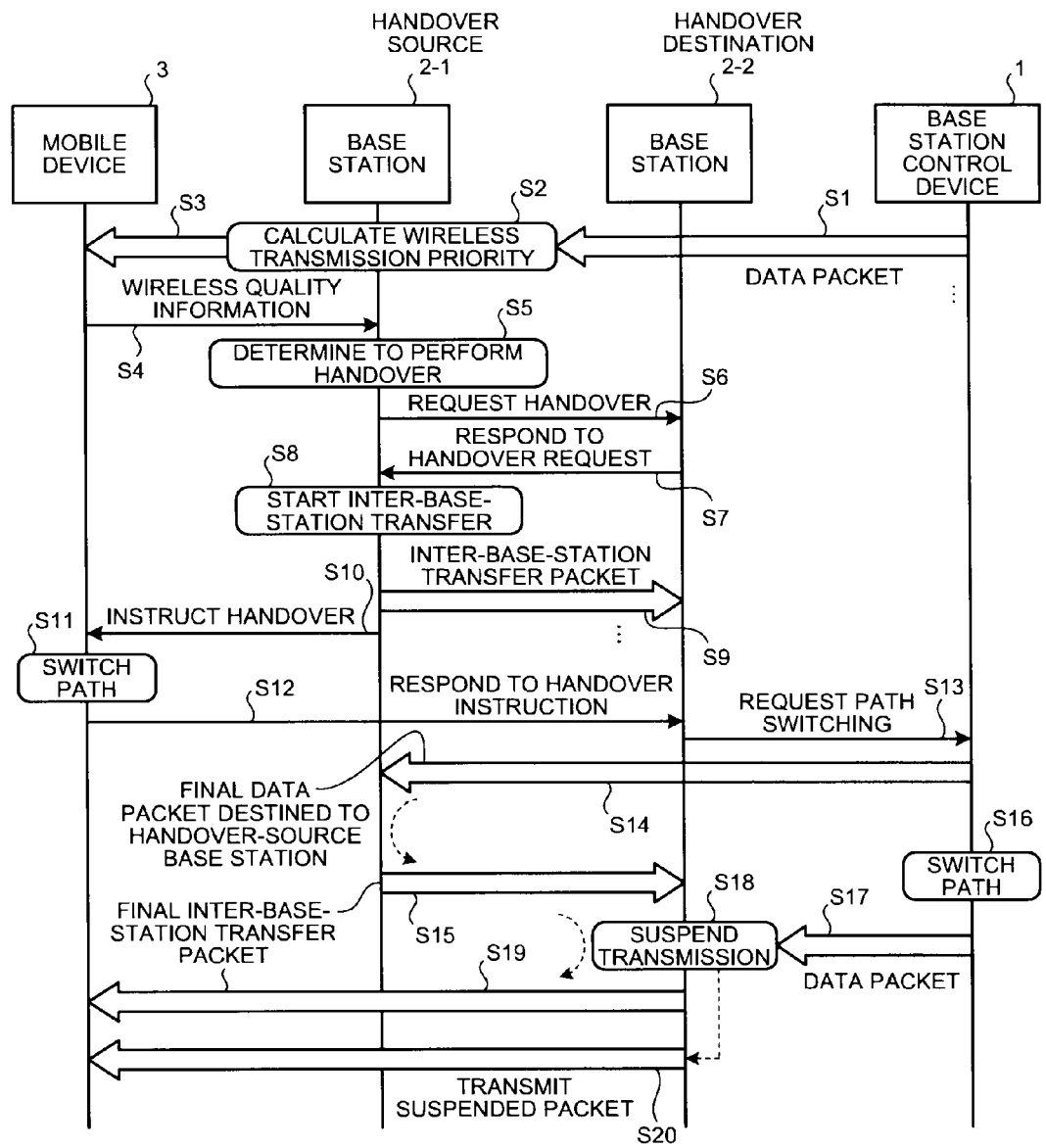
FIG. 3 depicts a handover operation of the first embodiment.

A handover operation to which a transfer-packet-priority control method according to the present invention is applied is explained next with reference to FIG. 3. FIG. 3 depicts the handover operation of the present embodiment.

First, the data transmitting unit 11 of the base station control device 1 transmits user data destined to the mobile device 3 received from a higher-level network to the base station 2-1 communicating with the mobile device 3 out of the base stations 2-1 to 2-n via the wired transmission path 5. The base station 2-1 temporarily stores into the buffer 21-1 the user data destined to the mobile device 3 received from the base station control device 1 (Step S1). Next, the read control unit 22-1 of the base station 2-1 calculates each wireless transmission priority based on a wireless-priority calculation method described later, for data packets destined to all wireless terminals connected to the base station 2-1 stored in the buffer 21-1 (Step S2). The read control unit 22-1 reads from the buffer 21-1 the data packets destined to users based on the calculated wireless transmission priorities. The wireless transmitting unit 23-1 converts the read data packets into wireless transmission signals, and transmits the signals to mobile devices within the cell 4-1 via the wireless transmission path (Step S3). It is assumed here that the read control unit 22-1 reads from the buffer 21-1 a data packet destined to the mobile device 3, and the wireless transmitting unit 23-1 transmits this data packet to the mobile device 3.

Next, the wireless receiving unit 31 of the mobile device 3 receives wireless transmission data from the base station 2-1 and also receives wireless signals from other wireless base stations, and extracts data necessary to calculate wireless quality information and transmits the extracted data to the handover control unit 32. The handover control unit 32 calculates information necessary to determine whether it is necessary to perform handover based on the extracted data, stores a calculated result into a control message as wireless quality information, and notifies the wireless quality information to the base station 2-1 (Step S4). In this case, data necessary to calculate the wireless quality information extracted by the wireless receiving unit 31 of the mobile device 3 includes data related to other wireless base stations that can be received as well as data of the base station 2-1.

Next, the handover control unit 24-1 of the base station 2-1 determines whether it is necessary to perform handover based on the wireless quality information stored within the control message received from the mobile device 3, and determines to perform handover (Step S5). At the same time, the handover control unit 24-1 selects a handover-destination base station (the base station 2-2, in this case). The handover-destination base station is selected by selecting good reception quality from information of base stations other than the base station 2-1 contained in the wireless quality information, for example. While FIG. 3 depicts the operation of performing handover, when it is determined that handover is unnecessary, the process returns to Step S1, and processes up to Step S5 are repeated.

The handover control unit 24-1 then notifies the read control unit 22-1 that handover is to be performed, and transmits a handover request message to the base station 2-2 as the selected handover destination (Step S6). Upon receiving the notification to perform the handover, the read control unit 22-1 stops reading a data packet destined to the mobile device 3, thereby stopping a data packet transmission destined to the mobile device 3. After stopping transmission of user data to the mobile device 3, a data packet destined to the mobile device 3 transmitted from the base station control device 1 is stored into the buffer 21-1. The handover control unit 24-2 of the base station 2-2 recognizes a reception of the handover request message at Step S6, and transmits to the base station 2-1 a handover-request response message in response to a received message (Step S7).

The handover control unit 24-1 of the base station 2-1 receives the handover-request response message at Step S7, and notifies a start of an inter-base-station transfer to the read control unit 22-1 (Step S8). In the present embodiment, it is assumed that a data packet destined to the mobile device 3 stored in the buffer 21-1 transmitted from the base station control device 1 after stopping the transmission of user data to the mobile device 3 at Step S6, is transmitted as an inter-base-station transfer packet, from the base station 2-1 to the base station 2-2. The read control unit 22-1 then reads the inter-base-station transfer packet stored in the buffer 21-1, and transmits the read inter-base-station transfer packet to the packet transfer unit 25-1. The packet transfer unit 25-1 transmits the transmitted inter-base-station transfer packet to the base station 2-2 via the inter-base-station transfer path 6 (Step S9). The inter-base-station transfer path 6 can directly connect between the base stations with a wired transmission path, or the base stations can be connected via the base station control device 1 by sing the wired transmission path 5.

The handover control unit 24-1 instructs the mobile device 3 handover to the base station 2-2, simultaneously with Step S8 (Step S10). The handover control unit 32 of the mobile device 3 then instructs the wireless receiving unit 31 to switch a path to perform a wireless transmission of the mobile device 3 from the base station 2-1 to the base station 2-2, following the instruction at Step S10. The wireless receiving unit 31 switches a path following the switching instruction, and notifies completion of switching to the handover control unit 32 (Step S11). The handover control unit 32 receives the notification of the completion of the handover, and transmits a handover instruction response to the base station 2-2 to notify that the path switching is completed (Step S12).

The handover control unit 24-2 of the base station 2-2 receives the handover instruction response from the mobile device 3, and transmits to the base station control device 1 a path-switching request message requesting switching of a transmission path of the data packet destined to the mobile device 3 to the base station 2-2 (Step S13). The path-switching control unit 12 of the base station control device 1 receives the path-switching request message transmitted at Step S13, and switches a transmission destination of the data packet to the base station 2-2. In this case, a packet transmitted last to the base station 2-1 as the handover source from the data transmitting unit 11 before the switching becomes a final data packet destined to the base station 2-1. That is, when the path-switching control unit 12 of the base station control device 1 receives the path-switching request message, the data transmitting unit 11 transmits the final data packet destined to the base station 2-1 (Step S14). Thereafter, the path-switching control unit 12 switches the transmission destination of the data packet destined to the mobile device 3 from the base station 2-1 to the base station 2-2 (Step S16).

After the switching at Step S16, the data transmitting unit 11 transmits the data packet destined to the mobile device 3 to the base station 2-2 (Step S17). The transmitted data is stored into the buffer 21-2 of the base station 2-2. The read control unit 22-2 does not read this stored data and suspends the transmission until when the final data packet destined to the base station 2-1 is transmitted to the mobile device 3 via the base station 2-2 (Step S18).

Meanwhile, while an inter-base-station transfer packet stored in the buffer 21-1 is present, the read control unit 22-1 repeats the transfer of the inter-base-station transfer packet at Step S9. The read control unit 22-1 reads from the buffer 21-1 the final data packet destined to the base station 2-1 transmitted at Step S14, as a final inter-base-station transfer packet, and transmits this final data packet to the packet transfer unit 25-1. The packet transfer unit transfers to the base station 2-2 the final data packet destined to the base station 2-1 as a final inter-base-station transfer packet (Step S15). The transferred final inter-base-station transfer packet is temporarily stored in the buffer 21-2 of the base station 2-2.

Therefore, the buffer 21-2 stores both the inter-base-station transfer packet and the data packet from the base station control device 1 transmitted at Step S17. To prevent an inversion of the order of the data packets, regarding the data packet related to the mobile device 3, the read control unit 22-2 needs to read the inter-base-station transfer packet earlier than the data packet from the base station control device 1. A wireless transmission priority of the inter-base-station transfer packet becomes higher, based on a wireless-transmission-priority calculation process described later. Therefore, there is no problem in transmitting the inter-base-station transfer packet with priority. As methods for the read control unit 22-2 to discriminate data within the buffer 21-2 between the inter-base-station transfer packet and the data packet directly received from the base station control device 1, there are a method of dividing an address region for storing and a method of dividing in advance a storage region with the buffer 21-2 by proving physically individual memories, for example. Further, data can be identified by providing the stored data in the buffer 21-2 with a flag expressing a transmission source apparatus.

The read control unit 22-2 reads the data stored in the buffer 21-1, and calculates wireless transmission priorities based on the wireless-transmission-priority calculation process described later. When a priority of the final inter-base-station transfer packet to the mobile device 3 becomes the highest based on the calculated priorities, the read control unit 22-2 transmits the final inter-base-station transfer packet to the mobile device 3 via the wireless transmitting unit 23-1 (Step S19).

At Step S19, the read control unit 22-2 needs to determine whether a final inter-base-station transfer packet is present as an inter-base-station transfer packet to be transmitted to the mobile device 3. For this determination, the buffer 21-2 is referenced, and it is checked whether an inter-base-station transfer packet destined to the mobile device 3 does not reach during a certain constant time. When an inter-base-station transfer packet destined to the mobile device 3 does not reach during a certain constant time, an inter-base-station transfer packet that reaches last can be determined as a final inter-base-station transfer packet.

The read control unit 22-2 then transmits the final inter-base-station transfer packet to the mobile device 3, and starts transmitting to the mobile device 3 a data packet destined to the mobile device 3 transmitted from the base station control device 1 of which transmission is suspended at Step S18 (Step S20). When all packets of which transmission is suspended at Step S18 are transmitted to the mobile device 3, the process related to the handover is finished. Thereafter, the base station 2-2 transfers the data packet destined to the mobile device 3 to the mobile device 3.

In the present embodiment, at Step S5 in FIG. 3, the base station 2-1 determines whether it is necessary to perform handover based on the wireless quality information received from the mobile device 3. Alternatively, the base station control device 1 can determine the performance of handover based on the wireless quality information notified from the mobile device 3. In this case, when the base station control device 1 determines that handover is to be performed, it suffices that the base station control device 1 notifies the determination of performing handover to the handover control unit 24-1 of the base station control device 1, and then operations at Step S6 and onwards are performed thereafter.

The wireless-transmission-priority calculation method in the present embodiment is explained. In the present embodiment, priority control of determining a wireless transmission priority is performed based on an upper limit value (a permissible delay) of a device retention time of a data packet. Each base station measures own-device retention time indicating a period from a time (a reception time) when the own device receives a data packet until a time when a wireless transmission priority is calculated. A wireless transmission priority is calculated so that the wireless transmission priority becomes higher when the own-device retention time is nearer to the permissible delay. A wireless transmission is performed in the high order of the wireless transmission priority. For the permissible delay, the same numerical value can be set in advance to all packets. Alternatively, a permissible delay can be determined corresponding to a kind of a data packet, such as a small permissible delay is applied to a real-time service. In the present embodiment, it is assumed that for the data packets directly transmitted from the base station control device 1 to the base stations 2-1 to 2-n, wireless transmission priorities are calculated based on the permissible delay and the own-device retention time.

Meanwhile, for inter-base-station transfer packets, in the example of FIG. 3, the base station 2-2 receives via the base station 2-1. When the base station 2-2 calculates a wireless transmission priority based on the permissible delay and the own-device retention time, a delay time via the base station 2-1 is not taken into account for the inter-base-station transfer packets. Therefore, when the time when a packet is transferred from the base station control device 1 is used as a base, a wireless transmission priority is calculated with a smaller delay time than an actual delay time for the inter-base-station transfer packets. As a result, the wireless transmission priority becomes lower than a numerical value that is originally supposed to be attached.

Therefore, in the present embodiment, for the inter-base-station transfer packets, to compensate for a delay time corresponding to the time via the base station 2-1 of the handover source, a constant priority set in advance is added to the wireless transmission priority calculated based on the permissible delay time and the own-device retention time. For example, the numerical value of the priority to be added is obtained beforehand as a priority corresponding to a wireless transmission priority calculated based on an assumed value of the own-device retention time of the base station 2-1. For the assumed value of the own-device retention time of the base station 2-1, the base station 2-1 of the handover destination obtains a standard value in advance based on the own-device retention time of the own station, for example. Alternatively, the assumed value of the own-device retention time of the base station 2-1 can be obtained as a priority corresponding to a wireless transmission priority calculated based on time including a delay time in the transfer path.

Figure 4:
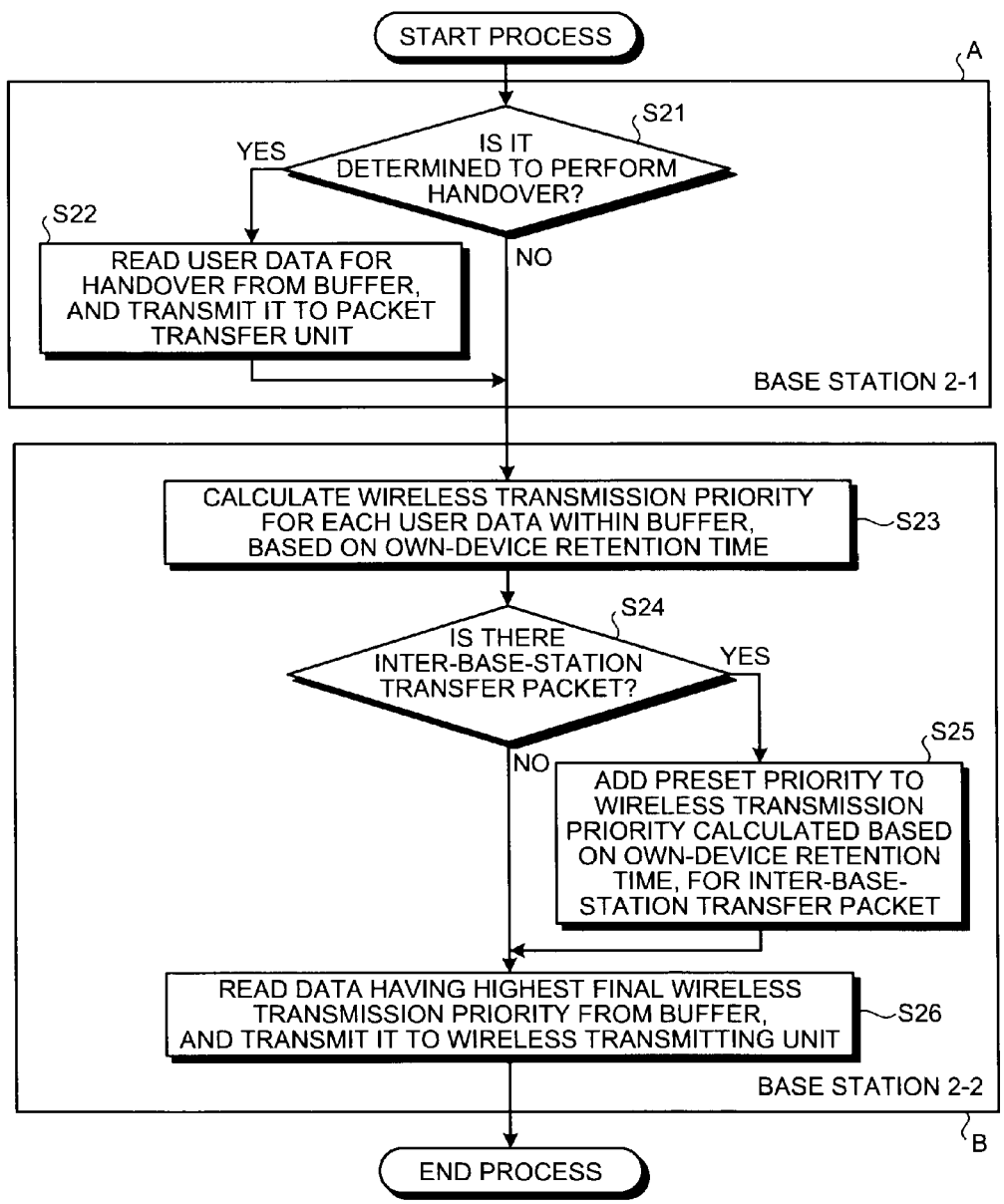
FIG. 4 is a flowchart of a wireless-transmission priority process of the first embodiment.

The wireless-transmission priority process of the present embodiment is explained next. FIG. 4 is a flowchart of the wireless-transmission priority process of the present embodiment. In FIG. 4, a process A is a process in the base station 2-1 as a handover source, and a process B is a process in the base station 2-2 as a handover destination.

As shown in FIG. 4, the handover control unit 24-1 of the base station 2-1 determines whether it is necessary to perform handover based on wireless quality information transmitted from the mobile device 3, and determines that the handover is to be performed when it is necessary to perform the handover as a result of the determination (Step S21: corresponding to Step S5 in FIG. 3). When the handover control unit 24-1 determines to perform the handover (YES at Step S21), the read control unit 22-1 receives a notice to perform the handover from the handover control unit 24-1, and stops the wireless transmission of a data packet of a user to be handed over (the mobile device 3 in this case). Upon receiving a notice of an inter-base-station transfer starting corresponding to Step S8 in FIG. 3, the read control unit 22-1 reads from the buffer 21-1 a data packet destined to the mobile device 3 received from the base station control device 1 during a period while the wireless transmission is suspended, and transfers the read data packet to the packet transfer unit. The packet transfer unit transfers the received packet to the base station 2-2 (Step S22).

On the other hand, when the handover control unit 24-1 does not determine to perform the handover (NO at Step S21), the base station 2-1 does not perform the process of an inter-base-station packet transfer.

The read control unit 22-2 of the base station 2-2 calculates wireless transmission priorities based on the permissible delay and the own-device retention time, for data packets stored in the buffer 21-2 (Step S23). The read control unit 22-2 determines whether there is an inter-base-station transfer packet among the data packets stored in the buffer 21-2 (Step S24). When there is an inter-base-station transfer packet (YES at Step S24), the read control unit 22-2 adds a priority set in advance to the wireless transmission priority calculated at Step S23, thereby obtaining a final wireless transmission priority. That is, when there is an inter-base-station transfer packet, the read control unit 22-2 determines a wireless transmission priority based on the permissible delay, the own-device retention time, and the priority set in advance, at Step S23 and Step S25. When there is no inter-base-station transfer packet (NO at Step S24), the process proceeds to Step S26. In this case, the wireless transmission priority calculated at Step S23 becomes a final wireless transmission priority. At Step S26, the read control unit 22-2 transmits a highest priority to the wireless transmitting unit 23-2 based on the final wireless transmission priority (Step S26).

As described above, in the present embodiment, in calculating a wireless communication priority of the data packet of the mobile device 3, the base station 2-2 as the handover destination adds a priority corresponding to the device retention time of the base station 2-1 as the handover source, for the inter-base-station transfer packets. Therefore, reduction of the wireless transmission priority of the inter-base-station transfer packets from a numerical value to be originally attached can be prevented. The fairness of priority control between users can be maintained, and increase of a transfer delay of the inter-base-station transfer packets can be prevented.

Second Embodiment

Figure 5:
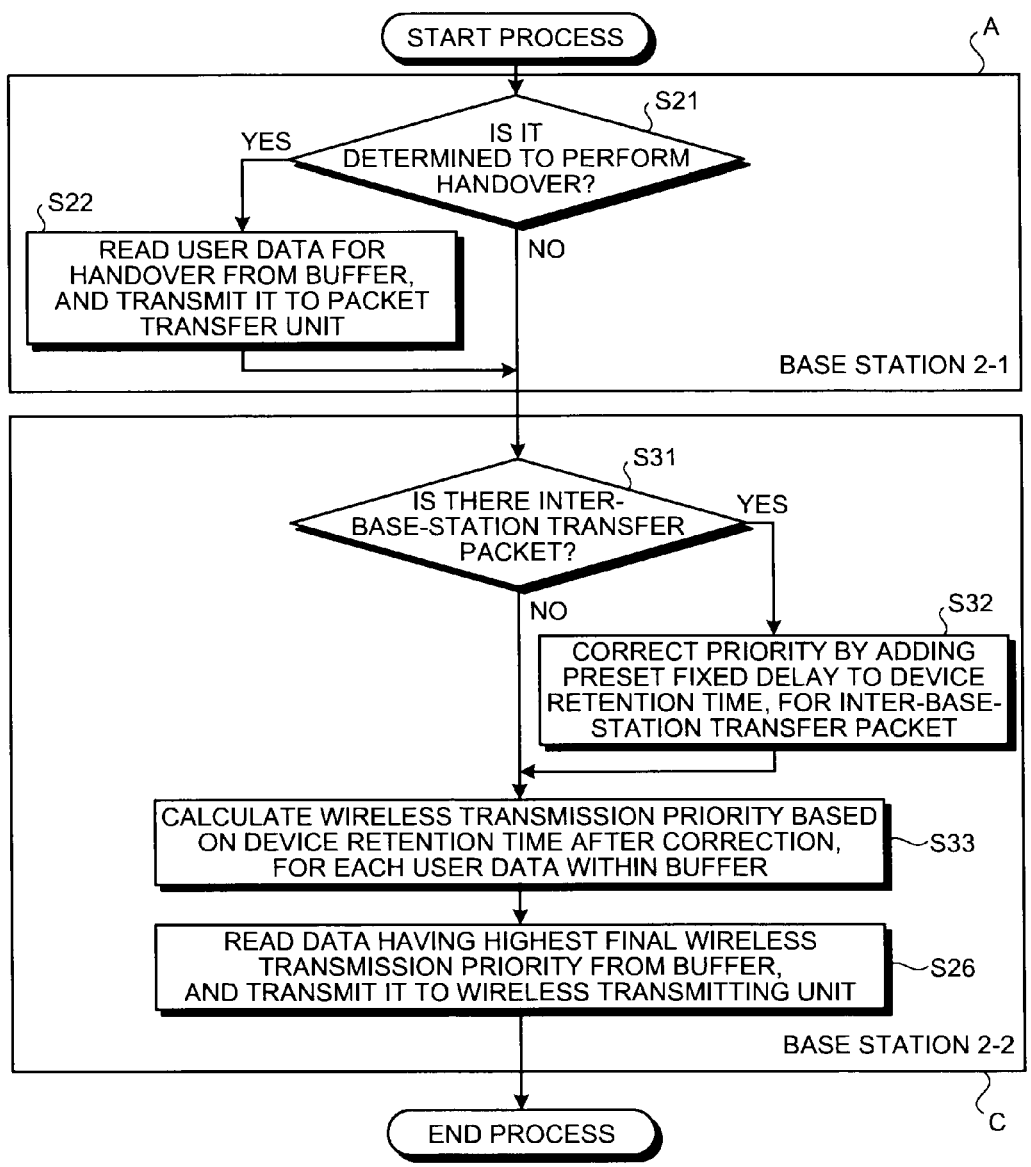
FIG. 5 is a flowchart of a wireless-transmission priority process of a second embodiment.

FIG. 5 is a flowchart of a wireless-transmission priority process of realizing a packet priority control method according to a second embodiment of the present invention. Configuration examples of a wireless access network and functional configuration examples of constituent apparatuses according to the present embodiment are identical to those according to the first embodiment. A handover operation of the present embodiment is also identical to that of the first embodiment. Only parts different from those in the first embodiment are explained below.

In FIG. 5, the process A is the process in the base station 2-1 as a handover source, and a process C is a process in the base station 2-2 as a handover destination. In the present embodiment, a wireless transmission priority is also corrected for inter-base-station transfer packets in a similar manner to that in the first embodiment. However, a correction method is different from that in the first embodiment.

Because the process A is the same as that in the first embodiment, explanations thereof will be omitted. For the process C, the read control unit 22-2 of the base station 2-2 first determines whether there is an inter-base-station transfer packet among data packets stored in the buffer 21-2 (Step S31). When there is an inter-base-station transfer packet (YES at Step S31), the read control unit 22-2 adds a fixed delay (a fixed delay time) set in advance to the own-device retention time for the inter-base-station transfer packet, thereby calculating a device retention time. The fixed delay is an assumed value of a standard own-device retention time in the base station 2-1 as the handover source. Alternatively, the device retention time can be calculated by further adding a delay time in the transfer path. When there is no inter-base-station transfer packet (NO at Step S31), the process proceeds to Step S33.

Next, at Step S33, the read control unit 22-2 calculates a wireless transmission priority based on the permissible delay and the device retention time (the own-device retention time is the device retention time after the correction, when the process is not via Step S32) for the data packets stored in the buffer 21-2. The read control unit 22-2 sets the wireless transmission priority obtained in this way as a final wireless transmission priority, and transmits a data packet to the wireless transmitting unit 23-2 based on the final wireless-transmission priority, at Step S26 identical to that in the first embodiment.

As described above, in the present embodiment, in calculating a wireless communication priority of the data packet of the mobile device 3, the base station 2-2 as the handover destination adds a fixed delay time corresponding to the own-device retention time of the base station 2-1 as the handover source, for the inter-base-station transfer packets, and calculates the wireless communication priority based on the added numerical value. Therefore, reduction of the wireless transmission priority of the inter-base-station transfer packets from a numerical value to be originally attached can be prevented. The fairness of priority control between users can be maintained, and increase of a transfer delay of the inter-base-station transfer packets can be prevented.

Third Embodiment

FIG. 6 is a functional configuration example of the base station control device 1, base stations 2a-1 and 2a-2, and the mobile device 3 that realize a packet priority control method according to a third embodiment of the present invention. Configurations of a wireless access network according to the present embodiment are identical to those of the first embodiment, except that the base stations 2-1 to 2-n are changed to base stations 2a-1 to 2a-n.

Dotted lines in FIG. 6 denote data transfer paths after handover. In the base station 2a-1 in FIG. 6, the read control unit 22-1 and the packet transfer unit 25-1 of the base station 2-1 in the first embodiment are changed to a read control unit 22a-1 and a packet transfer unit 25a-1, respectively. Other constituent elements are the same as those in the base station 2-1 according to the first embodiment. The base station 2a-2 has a read control unit 22a-2 instead of the read control unit 22-2 of the base station 2-2 according to the first embodiment, and additionally has a transfer-frame receiving unit 26-2. Other constituent elements are identical to those of the base station 2-2 according to the first embodiment. Elements having the same functions as those in the first embodiment are denoted by like reference numerals, and explanations thereof will be omitted. The base station 2a-1 and the base station 2a-2 can generally become a handover source and a handover destination, in a similar manner to that of the first embodiment. Therefore, the base stations 2a-1 and 2a-2 have the same configurations. For the sake of explanation, functional configurations necessary for a handover source are shown for the base station 2a-1, and functional configurations necessary for a handover destination are shown for the base station 2a-2.

A handover operation of the present embodiment is also identical to that of the first embodiment, except that the base station 2a-1 and the base station 2a-2 perform the operations of the base station 2-1 and the base station 2-2, respectively. Therefore, only parts different from those in the first embodiment are explained below.

FIG. 7 is a flowchart of a wireless-transmission priority process of the present embodiment. A process D is a process in the base station 2a-1 as a handover source, and a process E is a process in the base station 2a-2 as a handover destination.

First, Step S21 and Step S22 are the same as Step S21 and Step S22 in the first embodiment, except that the read control unit 22a-1 and the packet transfer unit 25a-1 perform the operations of the read control unit 22-1 and the packet transfer unit 25-1 of the base station 2-1 in the first embodiment. When it is determined to perform the handover at Step S21 (YES at Step S21), the packet transfer unit 25a-1 adds priority information (information to determine a wireless transmission priority, and a wireless transmission priority calculated based on own-device retention time of the base station 2a-1, for example) for each inter-base-station transfer packet, and transmits an added result as an inter-base-station transfer frame (Step S41). The packet transfer unit 25a-1 transmits the inter-base-station transfer frame to the base station 2a-2. In the present embodiment, a region for assigning priority information for each packet is provided in the inter-base-station transfer frame.

The transfer-frame receiving unit 26-2 of the base station 2a-2 then receives the inter-base-station transfer frame transmitted from the base station 2a-1, extracts priority information of the inter-base-station transfer packet from this frame, and stores the inter-base-station transfer packet together with the extracted priority information into the buffer 21-2 (Step S42).

Step S23 and Step S24 are the same as Step S23 and Step S24 in the first embodiment, except that the read control unit 22a-2 performs the operation of the read control unit 22-2 in the first embodiment, and thus explanations of these steps are omitted. When it is determined at Step S24 that there is an inter-base-station transfer packet, the read control unit 22a-2 corrects the wireless transmission priority calculated at Step S23 by using the priority information for each packet stored at Step S42 (Step S43). For this correction, when priority information is the wireless transmission priority calculated based on the device retention time of the base station 2a-1, for example, the priority information is added to the priority obtained at Step S23. The calculated wireless transmission priority is set as final wireless transmission priority, in a similar manner to that at Step S26 in the first embodiment. A data packet is transmitted to the wireless transmitting unit 23-2 based on the final wireless transmission priority.

In the present embodiment, an example of setting a wireless transmission priority calculated based on the own-device retention time of the base station 2a-1 as the handover source has been explained as priority information to be added to the inter-base-station transfer packet as described above. Alternatively, for the priority information, there can be also used such information as the own-device retention time of the base station 2a-1, and a packet reception time from the base station control device 1 of the base station 2a-1. When the priority information is the own-device retention time of the base station 2a-1, Steps S31, S32, and S33 in the second embodiment are performed instead of Steps S23, S24, and S43. At Step S32, correction can be performed by using the priority information instead of the fixed delay.

When the priority information is the packet reception time from the base station control device 1 of the base station 2a-1, the base station 2a-2 as the handover destination calculates a wireless transmission priority by using a difference between the packet reception time as priority information and a time of calculating the wireless transmission priority, instead of the own-device retention time. The own-device retention time is corrected by also taking into consideration the delay time before the transfer in a similar manner to that in the second embodiment. Because the actual delay time is used by calculating this time, precision is higher than that when the fixed delay in the second embodiment is added. When the priority information is the packet reception time, Steps S31, S32, and S33 in the second embodiment are performed instead of Steps S23, S24, and S43. At Step S32, the read control unit 22a-1 calculates a difference between the packet reception time as priority information and a time of calculating the wireless transmission priority, and the calculated difference is used as the device retention time after the correction.

In addition, the priority information can be coded information corresponding to a range of these values. Each base station can keep a list of a relationship between codes and these values, and the read control unit 22a-1 can convert values into codes following this list.

As described above, in the present embodiment, the base station 2a-1 adds priority information to the inter-base-station transfer packets for each data packet in the priority control of a data transmission destined to the mobile device 3, and transmits each data packet as an inter-base-station transfer frame. The base station 2a-2 corrects the wireless transmission priority by using the priority information contained in the inter-base-station transfer frame. Therefore, when the base station 2a-1 as the handover source base station adds the own-device retention time of the own station as the priority information, for example, the device retention time of the base station 2a-1 can be obtained more accurately than those in the first embodiment and the second embodiment. As a result, validity of the wireless-transmission-priority calculation can be improved, and a delay prevention effect of the inter-base-station transfer packets can be improved.

Fourth Embodiment

FIG. 8 is a functional configuration example of the base station control device 1, base stations 2b-1 and 2b-2, and the mobile device 3 that realize a packet priority control method according to a fourth embodiment of the present invention. Configurations of a wireless access network according to the present embodiment are identical to those of the first embodiment, except that the base stations 2-1 to 2-n are changed to base stations 2b-1 to 2b-n.

Dotted lines in FIG. 8 denote data transfer paths after handover. In the base station 2b-1 in FIG. 8, the read control unit 22-1 of the base station 2-1 in the first embodiment is changed to a read control unit 22b-1. Other constituent elements are the same as those in the base station 2-1 according to the first embodiment. The base station 2b-2 has a read control unit 22b-2 instead of the read control unit 22-2 of the base station 2-2 according to the first embodiment. Other constituent elements are identical to those of the base station 2-2 according to the first embodiment. Elements having the same functions as those in the first embodiment are denoted by like reference numerals, and explanations thereof will be omitted. The base station 2b-1 and the base station 2b-2 can generally become a handover source and a handover destination, in a similar manner to that of the first embodiment. Therefore, the base stations 2b-1 and 2b-2 have the same configurations. For the sake of explanation, functional configurations necessary for a handover source are shown for the base station 2b-1, and functional configurations necessary for a handover destination are shown for the base station 2b-2.

A handover operation of the present embodiment is also identical to that of the first embodiment, except that the base station 2b-1 and the base station 2b-2 perform the operations of the base station 2-1 and the base station 2-2, respectively. Therefore, only parts different from those in the first embodiment are explained below.

FIG. 9 is a flowchart of a wireless-transmission priority process of the present embodiment. The process A is a process in the base station 2b-1 as a handover source, and a process F is a process in the base station 2b-2 as a handover destination.

The process A is identical to that of the first embodiment, except that the operation of the base station 2-1 is changed to the operation of the base station 2b-1, and therefore explanations of the process will be omitted. Step S23, Step S24, and Step S26 are the same as those in the first embodiment, except that the operation of the base station 2-2 is changed to the operation of the base station 2b-2, and therefore explanations of these steps will be omitted.

When the read control unit 22b-2 determines at Step S24 that there is an inter-base-station transfer packet (YES at Step S24), the process proceeds to Step S25a. The process at Step S25a is identical to that at Step S25. When the read control unit 22b-2 determines at Step S24 that there is no inter-base-station transfer packet (NO at Step S24), the read control unit 22b-2 determines whether there is a packet (hereinafter, "in-transfer reception packet") directly received from the base station control device 1 during a transfer of inter-base-station transfer packets (Step S51). The determination of whether there is an in-transfer reception packet is performed as follows. Specifically, for example, during a period from when the handover control unit 24-2 receives a handover request at Step S6 in FIG. 3 until when a wireless transmission of a final inter-base-station transfer packet is completed, a packet destined to the mobile device 3 arrived from the base station control device 1 is set as an in-transfer reception packet, and this packet is stored into an exclusive region of the buffer 21-2. The discrimination can be performed by this.

When it is determined at Step S51 that there is an in-transfer reception packet (YES at Step S51), the read control unit 22b-2 adds a priority set in advance to the priority calculated at Step S23, thereby providing a final wireless transmission priority, for the in-transfer reception packet, in a similar manner to that for the inter-base-station transfer packet (Step S25a). The priority set in advance is a priority corresponding to the wireless transmission priority calculated based on an assumed value of the own-device retention time of the base station 2b-1, for example, in a similar manner to that of the first embodiment. When it is determined at Step S51 that there is no in-transfer reception packet (NO at Step S51), the wireless transmission priority calculated at Step S23 becomes a final wireless transmission priority, and the process proceeds to Step S26.

At Step S26, the read control unit 22b-2 transmits a data packet to the wireless transmitting unit 23-2 based on the final wireless transmission priority in a similar manner to that at Step S26 in the first embodiment.

In the present embodiment, Step S51 is added to the operation in the first embodiment, and at Step S25a, a priority is calculated for the in-transfer reception packet in a similar manner to that for the inter-base-station transfer packet. Alternatively, Step S51 can be added after Step S31 of the operation in the second embodiment, thereby calculating the priority. In this case, when it is determined at Step S51 that there is an in-transfer reception packet (YES at Step S51), the process proceeds to Step S32. At Step S32, the read control unit 22b-2 also adds a fixed delay to the device retention time for the in-transfer reception packet, in a similar manner to that for the inter-base-station transfer packet. When there is no in-transfer reception packet (NO at Step S51), the process proceeds to Step S33.

As described above, in the present embodiment, in the base station 2b-2, the read control unit 22b-2 adds a priority equivalent to the wireless transmission priority calculated based on the assumed value of the device retention time of the base station 2b-1 as the handover source at the time of calculating the wireless transmission priority, for the in-transfer reception packet as well as for the inter-base-station transfer packet. Therefore, reduction of the wireless communication priority can be prevented for a packet stagnant in the base station 2b-2 while performing the inter-base-station packet transfer as well as for the base-station transfer packet.

Fifth Embodiment

FIG. 10 is a functional configuration example of the base station control device 1, base stations 2c-1 and 2c-2, and the mobile device 3 that realize a packet priority control method according to a fifth embodiment of the present invention. Configurations of a wireless access network according to the present embodiment are identical to those of the first embodiment, except that the base stations 2-1 to 2-n are changed to base stations 2c-1 to 2c-n.

Dotted lines in FIG. 10 denote data transfer paths after handover. In the base station 2c-1 in FIG. 10, the read control unit 22-1 of the base station 2-1 in the first embodiment is changed to a read control unit 22c-1. Other constituent elements are the same as those in the base station 2-1 according to the first embodiment. The base station 2c-2 has the read control unit 22c-1 instead of the read control unit 22-1 of the base station 2-1 according to the first embodiment. Other constituent elements are identical to those of the base station 2-2 according to the first embodiment. Elements having the same functions as those in the first embodiment are denoted by like reference numerals, and explanations thereof will be omitted. The base station 2c-1 and the base station 2c-2 can generally become a handover source and a handover destination, in a similar manner to that of the first embodiment. Therefore, the base stations 2c-1 and 2c-2 have the same configurations. For the sake of explanation, functional configurations necessary for a handover source are shown for the base station 2c-1, and functional configurations necessary for a handover destination are shown for the base station 2c-2.

A handover operation of the present embodiment is also identical to that of the first embodiment, except that the base station 2c-1 and the base station 2c-2 perform the operations of the base station 2-1 and the base station 2-2, respectively. Therefore, only parts different from those in the first embodiment are explained below.

FIG. 11 is a flowchart of a wireless-transmission priority process of the present embodiment. The process A is a process in the base station 2c-1 as a handover source, and a process G is a process in the base station 2c-2 as a handover destination.

The process A is identical to that of the first embodiment, except that the operation of the base station 2-1 is changed to the operation of the base station 2b-1, and therefore explanations of this process will be omitted. Step S23, Step S24, and Step S26 are the same as those in the first embodiment, except that the operation of the base station 2-2 is changed to the operation of the base station 2b-2, and therefore explanations of these steps will be omitted.

When a read control unit 22c-2 determines at Step S24 that there is an inter-base-station transfer packet (YES at Step S24), the process proceeds to Step S25a. The process at Step S25a is identical to that at Step S25. When the read control unit 22c-2 determines at Step S24 that there is no inter-base-station transfer packet (NO at Step S24), the read control unit 22b-2 determines whether the number of stagnation (number stored in the buffer 21-2) of packets (hereinafter, "in-transfer reception packets") directly received from the base station control device 1 during a transfer of inter-base-station transfer packets exceeds a threshold value set in advance (Step S61). The threshold value is a numerical value used to determine whether to increase a wireless transmission priority for the in-transfer reception packets). The threshold value can be set to an optional value. When the numerical value is increased, transmission of the in-transfer reception packets is delayed. When the numerical value is decreased, this affects the transmission of data packets of other users. Therefore, a proper threshold value is set by taking these elements into consideration.

When it is determined at Step S61 that a stagnant number of in-transfer reception packets exceeds the threshold value (YES at Step S61), the read control unit 22c-2 adds a priority set in advance to the priority calculated at Step S23, thereby providing a final wireless transmission priority, for the in-transfer reception packet, in a similar manner to that for the inter-base-station transfer packet (Step S25a). A value of the priority set in advance is a priority corresponding to the wireless transmission priority calculated based on an assumed value of the own-device retention time of the base station 2c-1, for example, in a similar manner to that of the first embodiment.

When it is determined at Step S61 that a stagnant number of in-transfer reception packets does not exceed the threshold value (NO at Step S61), the wireless transmission priority calculated at Step S23 becomes a final wireless transmission priority, and the process proceeds to Step S26.

In the present embodiment, Step S61 is added to the first embodiment, and at Step S25a, a priority is calculated for the in-transfer reception packet in a similar manner to that for the inter-base-station transfer packet. Alternatively, Step S61 can be added after Step S31 of the operation in the second embodiment, thereby calculating the priority. In this case, when it is determined at Step S61 that the stagnant number of in-transfer reception packets exceeds the threshold value (YES at Step S61), the process proceeds to Step S32. At Step S32, the read control unit 22c-2 adds a fixed delay to the device retention time for the in-transfer reception packet, in a similar manner to that for the inter-base-station transfer packet. When it is determined that a stagnant number of the in-transfer reception packet does not exceed the threshold value (NO at Step S61), the process proceeds to Step S33.

As described above, in the base station 2c-2, when a stagnant number of the in-transfer reception packets exceeds the threshold value, the read control unit 22c-2 adds a priority equivalent to the wireless transmission priority calculated based on the assumed value of the device retention time of the base station 2c-1 as the handover source at the time of calculating the wireless transmission priority, for the in-transfer reception packet as well as for the inter-base-station transfer packet. Therefore, while suppressing influences on other users, reduction of the wireless communication priority can be prevented for a packet stagnant in the base station 2c-2 while performing the inter-base-station packet transfer.

INDUSTRIAL APPLICABILITY

As described above, the packet priority control method according to the present invention is useful for handover of a wireless communication system, and particularly suitable to transfer packet priority control at a base station that can be connected by plural mobile devices.

The invention claimed is:
1. A packet priority control method for a specific mobile device to perform a handover in a wireless communication system in which a base station calculates a wireless transmission priority for each predetermined data packet received from a base station control device based on a station retention time from a reception time at which the data packet is received until a current time, the packet priority control method comprising:

inter-base-station packet transferring including a handover-source base station transferring a data packet destined to the mobile device received from the base station control device to a handover-destination base station as an inter-base-station transfer packet during a stopping period for which the handover-source base station stops a wireless transmission of a data packet to the mobile device; and transmission controlling including the handover-destination base station calculating a wireless transmission priority for the inter-base-station transfer packet based on a first retention time that is a station retention time in the handover-destination base station and a second retention time that is an estimated value of a retention time in the handover-source base station, wherein the calculating includes adding the second retention time to the first retention time to obtain a total retention time, and obtaining the wireless transmission priority based on the total retention time.

2. The packet priority control method according to claim 1, further comprising priority-information adding including the handover-source base station adding priority information to the inter-base-station transfer packet, wherein the calculating further includes using the priority information as the second retention time.

3. The packet priority control method according to claim 1, wherein the transmission controlling further includes determining whether the data packet destined to the mobile device received from the base station control device is a data packet received during a transfer of the inter-base-station transfer packet, and calculating, when it is determined that the data packet destined to the mobile device received from the base station control device is a data packet received during a transfer of the inter-base-station transfer packet at the determining, the wireless transmission priority for the data packet.

4. The packet priority control method according to claim 1, wherein the transmission controlling further includes determining whether a number of data packets in retention destined to the mobile device received from the base station control device after starting a transfer of the inter-base-station transfer packet is equal to or larger than a predetermined threshold, and calculating, when it is determined that the number of data packets in retention destined to the mobile device received from the base station control device after starting a transfer of the inter-base-station transfer packet is equal to or larger than the threshold at the determining, the wireless transmission priority for the data packet.

5. A packet priority control method for a specific mobile device to perform a handover in a wireless communication system in which a base station calculates a wireless transmission priority for each predetermined data packet received from a base station control device based on a station retention time from a reception time at which the data packet is received until a current time, the packet priority control method comprising:

inter-base-station packet transferring including a handover-source base station transferring a data packet destined to the mobile device received from the base station control device to a handover-destination base station as an inter-base-station transfer packet during a stopping period for which the handover-source base station stops a wireless transmission of a data packet to the mobile device;

transmission controlling including the handover-destination base station calculating a wireless transmission priority for the inter-base-station transfer packet based on a first retention time that is a station retention time in the handover-destination base station and a second retention time that is an estimated value of a retention time in the handover-source base station; and priority-information adding including the handover-source base station adding priority information to the inter-base-station transfer packet, wherein the calculating includes adding a second wireless transmission priority corresponding to the second retention time to a first wireless transmission priority corresponding to the first retention time, and the calculating further includes using the priority information as the second wireless transmission priority.

6. A base station that constitutes a wireless communication system together with a base station control device and a mobile device that performs a handover, the base station calculating a wireless transmission priority for each predetermined data packet received from the base station control device based on a station retention time from a reception time at which the data packet is received until a current time, wherein when a handover-source base station transfers a data packet destined to the mobile device received from the base station control device to a handover-destination base station as an inter-base-station transfer packet during a stopping period for which the handover-source base station stops a wireless transmission of a data packet to the mobile device, the base station operates as the handover-destination base station, and the base station comprises a calculating unit that calculates a wireless transmission priority for the inter-base-station transfer packet based on a first retention time that is a station retention time in the base station and a second retention time that is an estimated value of a retention time in the handover-source base station, wherein the calculating unit calculates the wireless transmission priority of the inter-base-station transfer packet by adding the second retention time to the first retention time to obtain a total retention time and obtaining the wireless transmission priority based on the total retention time.

7. The base station according to claim 6, further comprising a determining unit that determines whether the data packet destined to the mobile device received from the base station control device is a data packet received during a transfer of the inter-base-station transfer packet, wherein when it is determined that the data packet destined to the mobile device received from the base station control device is a data packet received during a transfer of the inter-base-station transfer packet, the calculating unit calculates the wireless transmission priority for the data packet based on the first retention time and the second retention time.

8. The base station according to claim 6, further comprising a determining unit that determines whether the data packet destined to the mobile device received from the base station control device is a data packet received during a transfer of the inter-base-station transfer packet, wherein when it is determined that the number of data packets in retention destined to the mobile device received from the base station control device after starting a transfer of the inter-base-station transfer packet is equal to or larger than the threshold, the calculating unit calculates the wireless transmission priority for the data packet based on the first retention time and the second retention time.

9. A second base station that operates as the handover-source base station, the second base station comprising:
   a transferring unit that transfers the data packet destined to the mobile device received from the base station control device to the handover-destination base station according to claim 6 as an inter-base-station transfer packet during the stopping period; and
   an adding that adds priority information indicating a wireless transmission priority corresponding to the second retention time to the inter-base-station transfer packet.

10. A second base station that operates as the handover-source base station, the second base station comprising:
    a transferring unit that transfers the data packet destined to the mobile device received from the base station control device to the handover-destination base station according to claim 6 as an inter-base-station transfer packet during the stopping period, and
    an adding unit that adds priority information indicating the second retention time to the inter-base-station transfer packet.

* * * * *